(12) United States Patent
Tamai et al.

(10) Patent No.: US 11,817,546 B2
(45) Date of Patent: Nov. 14, 2023

(54) LITHIUM ION SECONDARY BATTERY

(71) Applicant: NEC Corporation, Tokyo (JP)

(72) Inventors: Suguru Tamai, Tokyo (JP); Noboru Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 482 days.

(21) Appl. No.: 16/333,512

(22) PCT Filed: Sep. 14, 2017

(86) PCT No.: PCT/JP2017/033246
§ 371 (c)(1),
(2) Date: Mar. 14, 2019

(87) PCT Pub. No.: WO2018/052077
PCT Pub. Date: Mar. 22, 2018

(65) Prior Publication Data
US 2019/0252716 A1    Aug. 15, 2019

(30) Foreign Application Priority Data
Sep. 15, 2016  (JP) .................. 2016-180715

(51) Int. Cl.
*H01M 10/0525*    (2010.01)
*H01M 4/131*    (2010.01)
(Continued)

(52) U.S. Cl.
CPC ....... *H01M 10/0525* (2013.01); *H01M 4/131* (2013.01); *H01M 4/485* (2013.01);
(Continued)

(58) Field of Classification Search
CPC ..... H01M 4/02–602; H01M 2004/027; H01M 10/04–0567; H01M 10/058; H01M 2220/20
(Continued)

(56) References Cited

U.S. PATENT DOCUMENTS

2007/0238025 A1    10/2007  Onukionuki et al.
2013/0101886 A1*    4/2013  Jung .................. H01M 50/417
429/231.95
(Continued)

FOREIGN PATENT DOCUMENTS

CN    101485013 A    7/2009
CN    101485014 A    7/2009
(Continued)

OTHER PUBLICATIONS

EPO English machine translation of JP 2015053152 originally published to Uenae K eiichiro on Mar. 19, 2015 (Year: 2015).*
(Continued)

*Primary Examiner* — Cynthia H Kelly
*Assistant Examiner* — Niara Trant
(74) *Attorney, Agent, or Firm* — Sughrue Mion, PLLC

(57) ABSTRACT

The purpose of one embodiment of the present invention is to provide a lithium ion secondary battery which has improved cycle characteristics and the negative electrode of which comprises a silicon oxide. The present invention relates to a lithium ion secondary battery comprising a silicon oxide and an electrolyte solution comprising a fluorinated acid anhydride.

11 Claims, 1 Drawing Sheet

(51) Int. Cl.
  *H01M 10/0567* (2010.01)
  *H01M 10/058* (2010.01)
  *H01M 4/62* (2006.01)
  *H01M 4/485* (2010.01)
  *H01M 4/60* (2006.01)
  *H01M 4/02* (2006.01)

(52) U.S. Cl.
  CPC .............. *H01M 4/602* (2013.01); *H01M 4/62* (2013.01); *H01M 10/058* (2013.01); *H01M 10/0567* (2013.01); *H01M 2004/027* (2013.01); *H01M 2220/20* (2013.01); *Y02E 60/10* (2013.01); *Y02T 10/70* (2013.01)

(58) Field of Classification Search
  USPC ........................................................ 429/209
  See application file for complete search history.

(56) References Cited

U.S. PATENT DOCUMENTS

| | | | | |
|---|---|---|---|---|
| 2013/0295439 | A1* | 11/2013 | Masarapu | H01M 4/38 429/163 |
| 2014/0120415 | A1 | 5/2014 | Suguro et al. | |
| 2014/0242452 | A1* | 8/2014 | Pieczonka | H01M 4/622 429/188 |
| 2015/0270540 | A1* | 9/2015 | Kouzu | H01M 4/364 252/502 |
| 2016/0359199 | A1* | 12/2016 | Galiano | H01M 10/0567 |
| 2017/0162910 | A1* | 6/2017 | Katou | H01M 10/052 |
| 2017/0214087 | A1 | 7/2017 | Yoshida et al. | |
| 2018/0175377 | A1* | 6/2018 | Hirose | H01M 4/1395 |

FOREIGN PATENT DOCUMENTS

| | | | | |
|---|---|---|---|---|
| CN | 105283984 A | | 1/2016 | |
| EP | 2863469 A1 | * | 4/2015 | ........ H01M 10/0567 |
| JP | 2002-231251 A | | 8/2002 | |
| JP | 2004-047404 A | | 2/2004 | |
| JP | 2004-231251 A | | 8/2004 | |
| JP | 2004-296115 A | | 10/2004 | |
| JP | 4415521 B2 | | 2/2010 | |
| JP | 2010-238504 A | | 10/2010 | |
| JP | 2015-053152 A | | 3/2015 | |
| JP | 2015-064983 A | | 4/2015 | |
| JP | 2015-164126 A | | 9/2015 | |
| WO | 2012/176873 A1 | | 12/2012 | |
| WO | 2013/038842 A1 | | 3/2013 | |
| WO | 2014/133107 A1 | | 9/2014 | |
| WO | 2015/140984 A1 | | 9/2015 | |
| WO | 2015/199063 A1 | | 12/2015 | |
| WO | WO-2016010090 A1 | * | 1/2016 | .......... H01M 10/052 |

OTHER PUBLICATIONS

International Search Report for PCT/JP2017/033246 dated Nov. 7, 2017 [PCT/ISA/210].
Japanese Office Action for JP Application No, 2018-539781 dated Jul. 6, 2021 with English Translation.
Chinese Office Action for CN Application No. 201780056195.3 dated Jul. 5, 2021 with English Translation.
Japanese Office Action for JP Application No. 2018-539781 dated Nov. 2, 2021 with English Translation.
Japanese Office Communication for JP Application No. 2018-539781 dated Mar. 15, 2022 with English Translation.
Chinese Office Action for CN Application No. 201780056195.3 dated Aug. 15, 2022 with English Translation.
Tao Zhanliang et al., "Si-Based Materials as the Anode of Lithium-Ion Batteries", Process in Chemistry, Mar. 24, 2011, pp. 318-326.
Chinese Office Action for CN Application No. 201780056195.3 dated Mar. 24, 2022 with English Translation.

* cited by examiner

LITHIUM ION SECONDARY BATTERY

CROSS REFERENCE TO RELATED APPLICATIONS

This application is a National Stage of International Application No. PCT/JP2017/033246 filed Sep. 14, 2017, claiming priority based on Japanese Patent Application No. 2016-180715 filed Sep. 15, 2016.

TECHNICAL FIELD

The present invention relates to a lithium ion secondary battery, methods for manufacturing the same and a vehicle equipped with the lithium ion secondary battery.

BACKGROUND ART

Lithium ion secondary batteries are used for various purposes. Along with this, there is a demand for a lithium ion secondary battery having higher energy density. To increase the energy density of a battery, the use of a Si based material having a large capability of absorbing and releasing lithium ions per unit volume in a negative electrode has been studied. However, since the Si based material largely expands and contracts during charge and discharge, active surfaces generated by the expansion and contraction decompose an electrolyte solution, causing a decrease in the capacity retention rate of a battery.

In order to improve the decrease in the capacity retention rate, it is effective to add an additive for forming SEI coating film, such as vinylene carbonate or fluoroethylene carbonate, to an electrolyte solution. Patent document 1 discloses that fluoroethylene carbonate and vinylene carbonate, which are used as additives, can improve the capacity retention rate of a battery using the Si based material in the negative electrode.

CITATION LIST

Patent Document

Patent Document 1: Japanese patent laid-open No. 2015-064983

SUMMARY OF INVENTION

Technical Problem

Even if the above-described electrolytic solution containing the additive such as vinylene carbonate or fluoroethylene carbonate is used, however, there has been the problem that the capacity of the battery using the Si based material in the negative electrode greatly decreases when charge and discharge cycles are repeated. Therefore, further improvement in cycle characteristics is required.

In view of the above mentioned problem, the purpose of one embodiment of the present invention is to provide a lithium ion secondary battery which has improved cycle characteristics and the negative electrode of which comprises a silicon oxide.

Solution to Problem

The first lithium ion secondary battery of the present invention comprises a negative electrode comprising a silicon oxide and an electrolyte solution comprising a fluorinated acid anhydride.

Advantageous Effect of Invention

According to one embodiment of the present invention, there is provided a lithium ion secondary battery which has improved cycle characteristics and the negative electrode of which comprises a silicon oxide.

DESCRIPTION OF EMBODIMENTS

Figure 1:
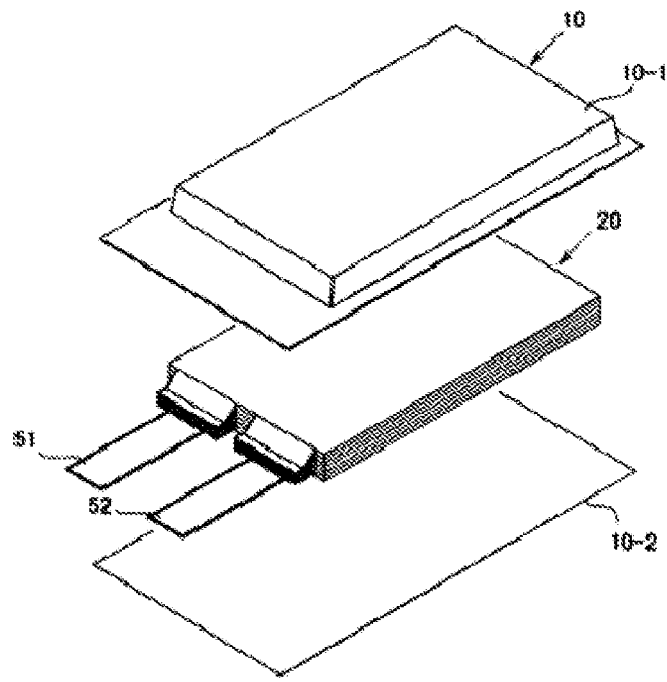
FIG. 1 is an exploded perspective view showing a basic structure of a film package battery.

The present embodiment will be described below.

<Electrolyte Solution>

The electrolyte solution comprises a fluorinated acid anhydride as an additive. The fluorinated acid anhydride of the present embodiment is a compound formed by replacing at least one of hydrogen atoms of an acid anhydride with fluorine. The acid anhydride is a compound having at least one acid anhydride structure in a molecule. The acid anhydride used may be a compound having a plurality of acid anhydride structures in a molecule.

It is presumed that the acid anhydride in which at least one hydrogen atom has been replaced with a fluorine atom has improved oxidation resistance and can reduce the oxidative decomposition at the positive electrode. The fluorine substitution ratio of the fluorinated acid anhydride {i.e., (the number of fluorine atoms)/(the total number of hydrogen atoms and fluorine atoms)} is preferably high. The fluorine substitution ratio of the fluorinated acid anhydride is preferably 25% or more, more preferably 50% or more and most preferably 100%.

In the present embodiment, the fluorinated acid anhydride having a ring structure (hereinafter, may be referred to as "fluorinated cyclic acid anhydride(s)") is preferred.

The fluorinated cyclic acid anhydride of the present embodiment includes, but not particularly limited, for example, anhydrides of carboxylic acids, anhydrides of sulfonic acids, anhydrides of carboxylic acids and sulfonic acids and the like.

Specific examples of the fluorinated carboxylic acid anhydrides having a ring structure include, but not limited to, fluorinated compounds of succinic anhydride, glutaric anhydride, maleic anhydride, citraconic anhydride, glutaconic anhydride, itaconic anhydride, diglycolic anhydride, phenyl succinic anhydride, 2-phenyl glutaric anhydride, cyclohexanedicarboxylic anhydride, cyclopentane tetracarboxylic dianhydride, 4-cyclohexene-1,2-dicarboxylic anhydride, 3,4,5,6-tetrahydrophthalic anhydride, 5-norbornene-2,3-dicarboxylic anhydride, phthalic anhydride, and pyromellitic anhydride and the like; specifically, for example, fluorosuccinic anhydride, tetrafluorosuccinic anhydride, difluoroglutaric anhydride, and the like. These may be used alone or in combination of two or more of these.

Specific examples of the fluorinated sulfonic acid anhydrides having a ring structure include, but not limited to, fluorinated compounds of 1,2-ethane disulfonic anhydride, 1,3-propane disulfonic anhydride, 1,4-butane disulfonic anhydride, 1,2-benzene disulfonic anhydride and the like; specifically, for example, tetrafluoro-1,2-ethane disulfonic anhydride, hexafluoro-1,3-propane disulfonic anhydride, octafluoro-1,4-butane disulfonic anhydride, 3-fluoro-1,2-benzene disulfonic anhydride, 4-fluoro-1,2-benzene disulfonic anhydride, 3,4,5,6-tetrafluoro-1,2-benzene disulfonic anhydride and the like. These may be used alone or in combination of two or more of these.

Specific examples of the fluorinated compounds of the anhydrides of carboxylic acids and sulfonic acids having a ring structure include, but not limited to, fluorinated compounds of 3-sulfopropionic anhydride, 2-methyl-3-sulfopropionic anhydride, 2,2-dimethyl-3-sulfopropionic anhydride, 2-ethyl-3-sulfopropionic anhydride, 2,2-diethyl-3-sulfopropionic acid anhydride and the like, specifically, for example, 2-fluoro-3-sulfopropionic anhydride, 2,2-difluoro-3-sulfopropionic anhydride, 2,2,3,3-tetrafluoro-3-sulfopropionic anhydride; fluorinated compounds of 2-sulfobenzoic anhydride and the like, specifically, for example, 3-fluoro-2-sulfobenzoic acid anhydride, 4-fluoro-2-sulfobenzoic acid anhydride, 5-fluoro-2-sulfobenzoic anhydride, 6-fluoro-2-sulfobenzoic anhydride, 3,6-difluoro-2-sulfobenzoic anhydride, 3,4,5,6-tetrafluoro-2-sulfobenzoic anhydride, 3-trifluoromethyl-2-sulfobenzoic anhydride, 4-trifluoromethyl-2-sulfobenzoic anhydride, 5-trifluoromethyl-2-sulfobenzoic anhydride, 6-trifluoromethyl-2-sulfobenzoic anhydride and the like. These may be used alone or in combination of two or more of these.

In the present embodiment, the fluorinated cyclic acid anhydride is preferably the fluorinated cyclic carboxylic acid anhydride. Further, the fluorinated cyclic carboxylic acid anhydride is preferably a fluorinated cyclic carboxylic acid anhydride represented by the following formula (1).

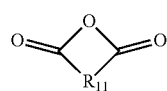

(1)

(In formula (1), $R_{11}$ is a substituted or unsubstituted alkylene group having 1 to 5 carbon atoms, a substituted or unsubstituted alkenylene group having 2 to 5 carbon atoms, a substituted or unsubstituted cycloalkan-diyl group having 5 to 12 carbon atoms, a substituted or unsubstituted cycloalken-diyl group having 5 to 12 carbon atoms, a substituted or unsubstituted benzene-diyl group, or a divalent group having 2 to 6 carbon atoms in which alkylene groups are bonded via an ether bond, with the proviso that at least part of the hydrogen atoms in Ru are replaced by fluorine atom(s).)

In the formula (1), the alkylene group and the alkenylene group for $R^{11}$ may be straight chain or branched.

In the formula (1), the number of carbon atoms in the alkylene group for $R_{11}$ is preferably 1, 2, 3 or 4. The number of carbon atoms in the alkenylene group for $R_{11}$ is preferably 2, 3 or 4.

In the formula (1), the number of carbon atoms in the cycloalkan-diyl group and the cycloalken-diyl group for $R_{11}$ is preferably 5, 6, 7, 8, 9 or 10. Herein, the cycloalkan-diyl group and the cycloalken-diyl group may be a divalent group having a plurality of ring structures such as bicycloalkylene group or bicycloalkenylene group.

In the formula (1), "the divalent group having 2 to 6 carbon atoms in which alkylene groups are bonded via an ether bond" represents a divalent group in which two or more alkylene groups are bonded via ether bond(s) (—O—), wherein two or more alkylene groups may be either the same or different. The alkylene group may have a branched chain.

Preferably the total number of carbon atoms of two or more alkylene groups is 2, 3, 4 or 5, and more preferably 2, 3 or 4.

In the formula (1), $R_{11}$ is more preferably a substituted or unsubstituted alkylene group having 2 to 5 carbon atoms, or a substituted or unsubstituted alkenylene group having 2 to 5 carbon atoms. It is more preferably a substituted or unsubstituted alkylene group having 2 or 3 carbon atoms, or a substituted or unsubstituted alkenylene group having 2 or 3 carbon atoms.

Further, in the formula (1), it is more preferable that the carbon skeleton (carbon-carbon bonds) in $R_{11}$ is constituted all by single bonds. This is seemingly because that gas generation caused by an excessive reaction is reduced as compared with the case containing a double bond in $R_{11}$. For example, $R_{11}$ is more preferably an alkylene group.

In the formula (1), substituents for $R_{11}$ include, for example, alkyl groups having 1 to 5 carbon atoms (for example, methyl group, ethyl group, propyl group, isopropyl group, butyl group), alkenyl groups having 2 to 6 carbon atoms (for example, vinyl group, 1-propenyl group, 2-propenyl group, 2-butenyl group), aryl groups (for example, phenyl group, benzyl group, tolyl group and xylyl group), alkoxy groups having 1 to 5 carbon atoms (for example, methoxy group, ethoxy group, n-propoxy group, iso-propoxy group, n-butoxy group, tert-butoxy group), amino groups (including dimethylamino group, methylamino group), carboxy group, hydroxy group, vinyl group, cyano group, halogen atoms (for example, chlorine atom, bromine atom) and the like. $R_{11}$ may have one substituent or may have a plurality of substituents.

Preferred examples of the fluorinated cyclic carboxylic acid anhydrides include fluorinated compounds of succinic anhydride and glutaric anhydride. In particular, a compound formed by replacing all of hydrogen atoms of an unsubstituted cyclic carboxylic acid anhydride with fluorine atoms is preferred. Specific examples thereof include perfluoroglutaric anhydride, perfluorosuccinic anhydride and the like.

Open-chain fluorinated acid anhydrides may be used.

Examples of the open-chain fluorinated acid anhydride include fluorinated compounds of carboxylic acid anhydrides such as acetic anhydride, propionic anhydride, butyric anhydride, crotonic anhydride and benzoic anhydride, for example, monofluoroacetic anhydride, trifluoroacetic anhydride, pentafluoropropionic anhydride; fluorinated compounds of sulfonic acid anhydrides such as methanesulfonic anhydride, ethanesulfonic anhydride, prop anesulfonic anhydride, butanesulfonic anhydride, pentanesulfonic anhydride, hexanesulfonic anhydride, vinylsulfonic anhydride and benzenesulfonic anhydride, for example, trifluoromethanesulfonic anhydride, 2,2,2-trifluoroethane sulfonic anhydride, pentafluoroethanesulfonic anhydride; fluorinated compounds of anhydrides of carboxylic acids and sulfonic acids such as acetic methanesulfonic anhydride, acetic ethanesulfonic anhydride, acetic prop anesulfonic anhydride, propionic methanesulfonic anhydride, propionic ethanesulfonic anhydrides and propionic prop anesulfonic anhydride, for example, trifluoroacetic methanesulfonic anhydride, trifluoroacetic ethansulfonic anhydride, trifluoroacetic propanesulfonic anhydride, acetic trifluoromethanesulfonic anhydride, acetic 2,2,2-trifluoroethane sulfonic anhydride, acetic pentafluoroethane sulfonic anhydride, trifluoroacetic trifluoromethanesulfonic anhydride, trifluoroacetic 2,2,2-trifluoroethanesulfonic anhydride, trifluoroacetic pentafluoroethanesulfonic anhydride and the like.

Among them, fluorinated carboxylic acid anhydrides are preferred, and compounds represented by the following formula (2) are more preferred.

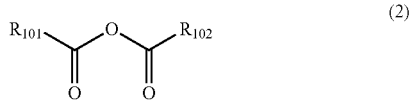

(2)

(In formula (2), $R_{101}$ and $R_{102}$ each independently represent a substituted or unsubstituted alkyl group having 1 to 6 carbon atoms, a substituted or unsubstituted aryl group having 6 to 12 carbon atoms, a substituted or unsubstituted heterocyclic group having 4 to 12 carbon atoms, or a substituted or unsubstituted alkenyl group having 2 to 6 carbon atoms, wherein, at least one of the hydrogen atoms in $R_{101}$ and $R_{102}$ is replaced by fluorine atom(s).)

In $R_{101}$ and $R_{102}$ of the formula (2), the number of carbon atoms in the alkyl group is preferably 1, 2, 3, 4 or 5, more preferably 1, 2, 3 or 4. The number of carbon atoms in the aryl group is preferably 6, 7, 8, 9 or 10. Examples of aryl groups include phenyl group, benzyl group, tolyl group and xylyl group. The number of carbon atoms in the heterocyclic group is preferably 4, 5, 6, 7, 8, 9 or 10, and more preferably 4, 5, 6, 7 or 8. The heterocyclic group comprises at least one hetero atom such as, oxygen, nitrogen and sulfur, and examples thereof include pyrrolyl group, pyridinyl group, furyl group, thienyl group and morpholino group. The number of carbon atoms in the alkenyl group is preferably 2, 3, 4 or 5, more preferably 2, 3 or 4. Further, the alkyl group or alkenyl group may be straight chain or branched.

In formula (2), $R_{101}$ and $R_{102}$ are each independently more preferably an alkyl group having 1 to 5 carbon atoms. The alkyl group may be straight chain or branched. The number of carbon atoms in the alkyl group is more preferably 1, 2, 3 or 4.

The substituents for $R_{101}$ and $R_{102}$ include, for example, alkyl group having 1 to 5 carbon atoms (for example, methyl group, ethyl group, propyl group, isopropyl group, butyl group), cycloalkyl group having 3 to 6 carbon atoms (for example, cyclopropyl group, cyclobutyl group, cyclopentyl group, cyclohexyl group), alkynyl group having 2 to 5 carbon atoms (for example, acetylenyl group, 1-propynyl group, 2-propynyl group, 2-butynyl group), alkoxy group having 1 to 5 carbon atoms (for example, methoxy group, ethoxy group, n-propoxy group, iso-propoxy group, n-butoxy group, tert-butoxy group), alkylcarbonyl group having 2 to 6 carbon atoms, arylcarbonyl group having 7 to 11 carbon atoms, alkoxycarbonyl group having 2 to 6 carbon atoms (for example, methoxycarbonyl group, ethoxycarbonyl group, tert-butoxycarbonyl group), aryloxycarbonyl group having 7 to 11 carbon atoms, alkylcarbonyloxy group having 2 to 6 carbon atoms, arylcarbonyloxy group having 7 to 11 carbon atoms, aryl group having 6 to 12 carbon atoms (for example, phenyl group, naphthyl group), aryloxy group having 6 to 10 carbon atoms (for example, phenoxy group, naphthoxy group), alkylthio group having 1 to 5 carbon atoms (for example, methylthio group, ethylthio group, n-propylthio group, iso-propylthio group, n-butylthio group, tert-butylthio group), arylthio group having 6 to 10 carbon atoms (for example, phenylthio group, naphthylthio group), alkylthiocarbonyl group having 2 to 6 carbon atoms, arylthiocarbonyl group having 7 to 11 carbon atoms, alkylsulfinyl group having 1 to 5 carbon atoms, arylsulfinyl group having 6 to 10 carbon atoms, alkylsulfonyl group having 1 to 5 carbon atoms, arylsulfonyl group having 6 to 10 carbon atoms, heteroatom-containing aromatic cyclic group having 4 to 8 carbon atoms (for example, furyl group, thienyl group), amino group (including dimethylamino group, methylamino group), carboxy group, hydroxy group, cyano group, halogen atom (for example, chlorine atom, bromine atom) and the like. $R_{101}$ and $R_{102}$ each independently may have one substituent or a plurality of substituents.

The open-chain fluorinated carboxylic acid anhydride is particularly preferably a fluorinated compound of acetic anhydride, propionic anhydride or butyric anhydride. In particular, a compound formed by replacing all of hydrogen atoms of an unsubstituted open-chain carboxylic acid anhydride with fluorine atoms is preferred. Specific examples thereof include trifluoroacetic anhydride, perfluoropropionic anhydride, heptafluorobutyric anhydride and the like.

The fluorinated acid anhydride may be used alone or in combination of two or more thereof.

The concentration of the fluorinated acid anhydride in the electrolyte solution is, but not particularly limited, preferably 0.005 to 10 mol/L. When the concentration of the fluorinated acid anhydride is 0.005 mol/L or more, the coating film of the fluorinated acid anhydride can be formed effectively. Further, moisture in the negative electrode can be effectively captured. Further, when the concentration of the fluorinated acid anhydride is 10 mol/L or less, it is possible to prevent the coating film from becoming thick due to the decomposition of the fluorinated acid anhydride, and an increase in resistance caused by the coating film can be reduced. The concentration of the fluorinated acid anhydride in the electrolyte solution is more preferably 0.01 mol/L or more, and still more preferably 0.05 mol/L or more. The concentration of the fluorinated acid anhydride in the electrolyte solution is more preferably 8 mol/L or less, and still more preferably 5 mol/L or less.

Further, the electrolyte solution may also optionally comprise additives other than fluorinated acid anhydrides. Other additives include, for example, overcharge-preventing agents, surface active agents and the like.

The electrolyte solution further comprises a non-aqueous solvent and a supporting salt. Examples of the non-aqueous solvent include, but not particularly limited, aprotic organic solvents, for examples, cyclic carbonates such as propylene carbonate (PC), ethylene carbonate (EC) and butylene carbonate (BC); open-chain carbonates such as dimethyl carbonate (DMC), diethyl carbonate (DEC), ethyl methyl carbonate (EMC) and dipropyl carbonate (DPC); aliphatic carboxylic acid esters such as propylene carbonate derivatives, methyl formate, methyl acetate and ethyl propionate; ethers such as diethyl ether and ethyl propyl ether; phosphoric acid esters such as trimethyl phosphate, triethyl phosphate, tripropyl phosphate, trioctyl phosphate and triphenyl phosphate; and fluorinated aprotic organic solvents obtainable by substituting at least part of hydrogen atoms of these compounds with fluorine atom(s), and the like. In one embodiment, a non-aqueous solvent not containing a fluorinated ether is preferred in some cases.

Among them, cyclic or open-chain carbonate(s) such as ethylene carbonate (EC), propylene carbonate (PC), butylene carbonate (BC), dimethyl carbonate (DMC), diethyl carbonate (DEC), ethyl methyl carbonate (MEC), dipropyl carbonate (DPC) and the like is preferably contained.

The non-aqueous solvent may be used alone or in combination of two or more.

The supporting salt is not particularly limited except that it comprises Li. Examples of the supporting salt include $LiPF_6$, $LiAsF_6$, $LiAlCl_4$, $LiClO_4$, $LiBF_4$, $LiSbF_6$, LiCF$_3$SO$_3$, LiC$_4$F$_9$SO$_3$, LiC(CF$_3$SO$_2$)$_2$, LiN(FSO$_2$)$_2$, LiN(CF$_3$SO$_2$)$_2$, LiN(C$_2$F$_5$SO$_2$)$_2$, LiB$_{10}$Cl$_{10}$. In addition, the supporting salt includes lower aliphatic lithium carboxylate, chloroboran lithium, lithium tetraphenylborate, LiBr, LiI, LiSCN, LiCl and the like. The supporting salt may be used alone or in combination of two or more.

The concentration of the supporting salt in the electrolyte solution is preferably 0.5 mol/L to 1.5 mol/L. When the concentration of the supporting salt is within this range, adjustment of density, viscosity and conductivity becomes easy.

<Negative Electrode>

The negative electrode comprises a current collector and a negative electrode mixture layer which is provided on the current collector and comprises a negative electrode active material, a binder and optionally a conductive assisting agent.

The negative electrode comprises a silicon oxide as an active material. When a silicon oxide is used as a negative electrode active material among Si based materials, a battery having better cycle characteristics can be obtained. The silicon oxides are represented by the composition formula SiO$_x$ where 0<x≤2. The silicon oxides are known as active materials having a large capability of absorbing and releasing lithium ions per unit volume. Therefore, a battery having a high silicon oxide content can have high energy density. In addition, the effect of improving the capacity retention rate caused by the electrolyte solution containing the fluorinated acid anhydride is large in a battery having a high silicon oxide content. From these viewpoints, the amount of the silicon oxide is preferably 5 mass % or more, more preferably 30 mass % or more, and especially preferably 70 mass % or more of the total amount of the negative electrode active material, and may be 100 mass %. The negative electrode active materials are materials capable of absorbing and desorbing lithium. Herein, the negative electrode active materials do not include materials not absorbing and desorbing lithium, such as binder.

The silicon oxide may be used in combination with other negative electrode active materials. In particular, it is preferred to use the silicon oxide in combination with carbon. The carbon can reduce the influence of the expansion and contraction and can improve cycle characteristics of the battery. Silicon oxide particles and carbon particles may be mixed and used, or the silicon oxide particles whose surfaces are coated with the carbon may be used. Examples of the carbon include graphite, amorphous carbon, graphene, diamond-like carbon, carbon nanotube, and composites thereof. Here, highly crystalline graphite is highly electroconductive, and has excellent adhesion to a negative electrode current collector composed of a metal such as copper as well as voltage flatness. On the other hand, low-crystallinity amorphous carbon shows relatively small volume expansion, is thus highly effective in lessening the volume expansion of the entire negative electrode, and is unlikely to undergo degradation resulting from non-uniformity such as grain boundaries and defects.

The negative electrode binder is not particularly limited, and examples thereof include polyvinylidene fluoride, vinylidene fluoride-hexafluoropropylene copolymer, vinylidene fluoride-tetrafluoroethylene copolymer, polytetrafluoroethylene, polypropylene, polyethylene, polybutadiene, polyacrylic acid, polyacrylic ester, polystyrene, polyacrylonitrile, polyimide, polyamideimide and the like. Mixtures and copolymers of a plurality of the above resins, and styrene butadiene rubber (SBR), which is a cross-linked body thereof, are also exemplified. When an aqueous binder such as an SBR emulsion is used, a thickener such as carboxymethyl cellulose (CMC) can also be used.

Among these, polyacrylic acid and polyimide are preferred, and polyacrylic acid is more preferred for improvement in cycle characteristics.

The polyacrylic acid is a polymer comprising a monomer unit derived from an (meth)acrylic acid denoted by the following formula (3) or a metal salt thereof. Herein, the term, "(meth)acrylic acid" means acrylic acid and methacrylic acid.

(3)

(In the formula, R$_1$ represents a hydrogen atom or methyl group.)

The carboxylic acid in the monomer unit represented by formula (3) may be a carboxylic acid metal salt. The metal is preferably a monovalent metal. Examples of the monovalent metal include alkali metals (for example, Na, Li, K, Rb, Cs, Fr and the like) and precious metals (for example, Ag, Au, Cu and the like). Among these, the alkali metals are preferred. As the alkali metal, Na, Li and K are preferred, and Na is most preferred. When the polyacrylic acid contains the carboxylic acid salt at least in part, the adhesiveness to constituent materials of the electrode mixture layer may be further improved in some cases.

The polyacrylic acid may comprise other monomer units. When the polycarylic acid comprises monomer units other than the (meth)acrylic acid monomer units, the peel strength between the electrode mixture layer and the current collector may be improved in some cases. Examples of other monomer units include monomer units derived from monomers including acids having ethylenically unsaturated group, for example, monocarboxylic acid compounds such as crotonic acid and pentenoic acid, dicarboxylic acid compounds such as itaconic acid and maleic acid, sulfonic acid compounds such as vinylsulfonic acid, and phosphonic acid compounds such as vinylphosphonic acid; aromatic olefins having acidic group such as styrene sulfonic acid, and styrene carboxylic acid; (meth)acrylic acid alkyl esters; acrylonitrile; aliphatic olefins such as ethylene, propylene, and butadiene; aromatic olefins such as styrene; and the like. In addition, other monomer units may be monomer units constituting a known polymer that is used as a binder of a secondary battery. If present, acids may be replaced with their salts in these monomer units.

In addition, in the polyacrylic acid according to present embodiment, at least one hydrogen atom in a main chain and a side chain may be substituted by halogen (fluorine, chlorine, bromine, iodine, etc.) or the like.

When the polyacrylic acid according to present embodiment is a copolymer containing two or more types of monomer units, the copolymer may be a random copolymer, an alternating copolymer, a block copolymer, a graft copolymer or combinations thereof.

The polyimide is a polymer comprising a monomer unit represented by the following formula (4).

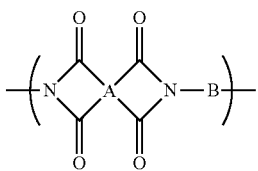

(4)

(In the formula, A represents a tetravalent group of a tetracarboxylic acid dianhydride, from which acid anhydride groups have been removed, and B represents a divalent group of a diamine, from which amino groups have been removed.)

The tetracarboxylic acid dianhydrides and the diamines are generally used as polyimide raw materials. The tetracarboxylic acid dianhydride and the diamine condense to form imide group of formula (4).

The polyimide is not particularly limited, and commercially available polyimide may be used. Examples of the tetracarboxylic acid dianhydride, which forms A of formula (4), include aromatic tetracarboxylic acid dianhydrides, such as 3,3',4,4'-biphenyltetracarboxylic dianhydride, pyromellitic dianhydride, 3,4'-oxydiphthalic anhydride, 4,4'-oxydiphthalic anhydride and 3,3',4,4'-benzophenonetetracarboxylic dianhydride, and aliphatic tetracarboxylic acid dianhydrides, such as 1,2,3,4-cyclobutanetetracarboxylic dianhydride, 1,2,3,4-cyclopentanetetracarboxylic dianhydride, 1,2,4,5-cyclohexanetetracarboxylic dianhydride, bicyclo[2.2.1]heptane-2,3,5,6-tetracarboxylic dianhydride and 1,2,3,4-butanetetracarboxylic dianhydride. Examples of the diamine, which forms B of formula (4), include aromatic diamines, such as p-phenylenediamine, m-phenylenediamine, p-xylylenediamine and m-xylylenediamine, and aliphatic diamines, such as cyclohexanediamine, di(aminomethyl)cyclohexane, diaminomethylbicycloheptane, and diaminomethyloxybicycloheptane.

The polyimide binder may comprise an imidization promotor, which promotes the reaction of a polyamic acid that is a precursor to a polyimide.

The lower limit of the amount of the negative electrode binder is preferably 1 part by mass or more, and more preferably 2 parts by mass or more, and the upper limit is preferably 30 parts by mass or less, and more preferably 25 parts by mass or less, based on 100 parts by mass of the negative electrode active material.

From the viewpoint of improving the conductivity, the negative electrode may comprise carbon and the like, for example, a conductive assisting agent such as carbonaceous fine particles of graphite, carbon black, acetylene black and the like.

As the negative electrode current collector, from the viewpoint of electrochemical stability, aluminum, nickel, stainless steel, chrome, copper, silver, alloys thereof may be used. As the shape thereof, foil, flat plate, mesh and the like are exemplified.

The negative electrode of the present embodiment may be produced by preparing a slurry comprising the negative electrode active material, the binder and a solvent, and applying this to the negative electrode current collector to form the negative electrode mixture layer.

<Positive Electrode>

The positive electrode comprises a current collector and a positive electrode mixture layer which is provided on the current collector and comprises a positive electrode active material, a binder and optionally a conductive assisting agent.

The positive electrode active material is not particularly limited, and may be selected from some viewpoints. From the viewpoint of high energy density, it is preferable to contain a compound having high capacity. Examples of the high capacity compound include lithium nickel composite oxides in which a part of the Ni of lithium nickelate ($LiNiO_2$) is replaced by another metal element, and layered lithium nickel composite oxides represented by the following formula (5) are preferred.

$Li_y Ni_{(1-x)} M_x O_2$         (5)

wherein $0 \leq x < 1$, $0 < y \leq 1.2$, and M is at least one element selected from the group consisting of Co, Al, Mn, Fe, Ti, and B.

From the viewpoint of high capacity, it is preferred that the content of Ni is high, that is, x is less than 0.5, further preferably 0.4 or less in the formula (5). Examples of such compounds include $Li_\alpha Ni_\beta Co_\gamma Mn_\delta O_2$ ($0 < \alpha \leq 1.2$, preferably $1 \leq \alpha \leq 1.2$, $\beta + \gamma + \delta = 1$, $\beta \geq 0.7$, and $\gamma \leq 0.2$) and $Li_\alpha Ni_\beta Co_\gamma Al_\delta O_2$ ($0 < \alpha \leq 1.2$, preferably $1 \leq \alpha \leq 1.2$, $\beta + \gamma + \delta = 1$, $\beta \geq 0.6$, preferably $\beta \geq 0.7$, and $\gamma \leq 0.2$) and particularly include $LiNi_\beta Co_\gamma Mn_\delta O_2$ ($0.75 \leq \beta \leq 0.85$, $0.05 \leq \gamma \leq 0.15$, and $0.10 \leq \delta \leq 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (5). In addition, it is also preferred that particular transition metals do not exceed half. Examples of such compounds include $Li_\alpha Ni_\beta Co_\gamma Mn_\delta O_2$ ($0 < \alpha \leq 1.2$, preferably $1 \leq \alpha \leq 1.2$, $\beta + \gamma + \delta = 1$, $0.2 \leq \beta \leq 0.5$, $0.1 \leq \gamma \leq 0.4$ and $0.1 \leq \delta \leq 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$, (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In addition, two or more compounds represented by the formula (5) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (5)) and a material in which the content of Ni does not exceed 0.5 (x is 0.5 or more, for example, NCM433), a battery having high capacity and high thermal stability can also be formed.

Examples of the positive electrode active materials other than the above include lithium manganate having a layered structure or a spinel structure such as $LiMnO_2$, $Li_xMn_2O_4$ ($0 < x < 2$), $Li_2MnO_3$, and $Li_xMn_{1.5}Ni_{0.5}O_4$ ($0 < x < 2$); $LiCoO_2$ or materials in which a part of the transition metal in this material is replaced by other metal(s); materials in which Li is excessive as compared with the stoichiometric composition in these lithium transition metal oxides; solid solutions of $Li_2MnO_3$ and $LiMO_2$ (M is a metal element), materials having an olivine structure such as $LiFePO_4$, and the like. In addition, materials in which a part of elements in these metal oxides is substituted by Al, Fe, P, Ti, Si, Pb, Sn, In, Bi, Ag, Ba, Ca, Hg, Pd, Pt, Te, Zn, La or the like are also usable. The positive electrode active materials described above may be used alone or in combination of two or more.

The positive electrode binder is not particularly limited, and polyvinylidene fluoride, vinylidene fluoride-hexafluoropropylene copolymer, vinylidene fluoride-tetrafluoroethylene copolymer, polytetrafluoroethylene, polypropylene, polyethylene, polybutadiene, polyacrylic acid, polyacrylic ester, polystyrene, polyacrylonitrile, polyimide, polyamide-imide and the like may be used. Also, the positive electrode binder may be a mixture, a copolymer or a cross-linked body of a plurality of the above resins, for example, styrene butadiene rubber (SBR). When an aqueous binder such as an SBR emulsion is used, a thickener such as carboxymethyl cellulose (CMC) can also be used.

The lower limit of the amount of the positive electrode binder is preferably 1 part by mass or more, and more preferably 2 parts by mass or more, and the upper limit is preferably 30 parts by mass or less, and more preferably 25 parts by mass or less, based on 100 parts by mass of the positive electrode active material.

The positive electrode current collector is not particularly limited, but the examples thereof include aluminum, nickel, silver, and alloys thereof. As the shape of the positive electrode current collector, foil, flat plate, mesh and the like are exemplified.

In the preparation of the positive electrode, conductive assisting agents may be added for the purpose of lowering the impedance. As the conductive assisting agents, carbonaceous fine particles of graphite, carbon black, acetylene black and the like are exemplified.

The positive electrode of the present embodiment may be produced by preparing a slurry comprising the positive electrode active material, the binder and a solvent, and applying this to the positive electrode current collector to form the positive electrode mixture layer.

<Separator>

The separator may be of any type as long as it prevents electron conduction between a positive electrode and a negative electrode, does not inhibit permeation of charged substances, and has durability against the electrolyte solution. Specific examples of a material used for such a separator include polyolefins such as polypropylene and polyethylene, cellulose, polyesters such as polyethylene terephthalate and polybutylene terephtalate, polyimide, polyvinylidene fluoride, and aromatic polyamides (aramid) such as polymetaphenylene isophthalamide, polyparaphenylene terephthalamide and copolyparaphenylene 3,4'-oxydiphenylene terephthalamide, and the like. These can be used as porous films, woven fabrics, nonwoven fabrics or the like.

<Insulation Layer>

An insulation layer may be formed on at least one surface of the positive electrode, the negative electrode and the separator. Examples of a method for forming the insulation layer include a doctor blade method, a die coater method, a CVD method, a sputtering method, and the like. The insulation layer may be formed at the same time as the positive electrode, the negative electrode or the separator. Materials constituting the insulation layer include a mixture of an insulating filler such as aluminum oxide or barium titanate and a binder such as SBR or PVdF.

<Structure of Lithium Ion Secondary Battery>

Figure 2:
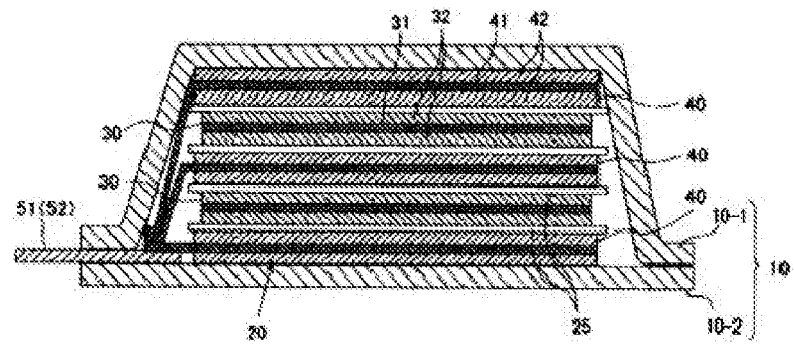
FIG. 2 is a cross-sectional view schematically showing a cross section of the battery of FIG. 1.

The lithium ion secondary battery according to the present embodiment, for example, has a structure as shown in FIGS. 1 and 2. This lithium ion secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 2. In the positive electrode 30, an electrode material 32 is applied to both surfaces of a metal foil 31, and also in the negative electrode 40, an electrode material 42 is applied to both surfaces of a metal foil 41 in the same manner. The present embodiment is not necessarily limited to stacking type batteries and may also be applied to batteries such as a winding type.

As shown in FIGS. 1 and 2, the lithium ion secondary battery may have an arrangement in which the electrode tabs are drawn out to one side of the outer package, but the electrode tab may be drawn out to both sides of the outer package. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 2). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 1, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 1 and FIG. 2, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

<Method for Manufacturing Lithium Ion Secondary Battery>

The lithium ion secondary battery according to the present embodiment can be manufactured by a conventional method. An example of a method for manufacturing the lithium ion secondary battery will be described taking a stacked laminate type lithium ion secondary battery as an example. First, in the dry air or an inert atmosphere, the positive electrode and the negative electrode are placed to oppose to each other via a separator to form an electrode element. Next, this electrode element is accommodated in an outer package (container), an electrolyte solution is injected, and the electrodes are impregnated with the electrolyte solution. Thereafter, the opening of the outer package is sealed to complete the lithium ion secondary battery.

<Assembled Battery>

A plurality of the lithium ion secondary batteries according to the present embodiment may be combined to form an assembled battery. The assembled battery may be configured by connecting two or more lithium ion secondary batteries according to the present embodiment in series or in parallel or in combination of both. The connection in series and/or parallel makes it possible to adjust the capacity and voltage freely. The number of the lithium ion secondary batteries included in the assembled battery can be set appropriately according to the battery capacity and output.

<Vehicle>

The lithium ion secondary battery or the assembled battery according to the present embodiment can be used in vehicles. Vehicles according to the present embodiment include hybrid vehicles, fuel cell vehicles, electric vehicles (besides four-wheel vehicles (cars commercial vehicles such as buses, and trucks, light automobiles, etc.), two-wheeled vehicle (bike) and tricycle), and the like. The vehicles according to the present embodiment is not limited to automobiles, it may be a variety of power source of other vehicles, such as a moving body like a train.

EXAMPLE

Example 1

<Negative Electrode>

A carbon-coated silicon oxide (mass ratio: silicon oxide/carbon=95/5) and natural graphite were used as negative electrode active materials. Hereafter, this carbon-coated silicon oxide is abbreviated as silicon oxide or SiO simply. 90 mass % of the active materials (mixing mass ratio: silicon oxide/natural graphite=100/0), 1 mass % of acetylene black as a conductive assisting agent, and 9 mass % of a polyacrylic acid copolymer comprising a monomer unit derived from sodium acrylate as a binder were mixed, and then pure water was added to this to prepare a negative electrode slurry. This was applied to both surfaces of a copper foil current collector having a thickness of 10 μm, dried at 80° C. for 5 minutes, and subjected to a press process, and then a negative electrode was produced. Herein, the mass % of each material means the ratio to the total amount of the negative electrode mixture.

<Positive Electrode>

$Li(Ni_{0.8}Co_{0.15}Al_{0.05})O_2$ was used as a positive electrode active material. This positive electrode active material, carbon black as a conductive assisting agent and polyvinylidene fluoride as a positive electrode binder were weighed at a mass ratio of 90:5:5. These were mixed with N-methylpyrrolidone to prepare a positive electrode slurry. The positive electrode slurry was applied to an aluminum foil having a thickness of 20 μm, dried, and pressed, and then a positive electrode was produced.

<Electrode Stack>

The fabricated three layers of the positive electrodes and four layers of the negative electrodes were stacked alternately via an aramid porous film as a separator. The end portions of the positive electrode current collectors that were not covered with the positive electrode active material and the end portions of the negative electrode current collectors that were not covered with the negative electrode active material were welded individually. Further, to the welding positions, an aluminum positive electrode terminal and a nickel negative electrode terminal were welded respectively, to obtain an electrode stack having a planar stacked structure.

<Electrolyte Solution>

Ethylene carbonate (EC) and diethyl carbonate (DEC) were mixed at a volume ratio of EC/DEC=30/70 to prepare an electrolyte solvent. $LiPF_6$ as a supporting salt and perfluoroglutaric anhydride (FGA) as an additive were respectively added to this, and an electrolyte solution was prepared. The concentration of $LiPF_6$ in the electrolyte solution was 1.0 mol/L, and the concentration of FGA in the electrolyte solution was 0.1 mol/L.

<Injection>

The electrode stack was accommodated in an aluminum laminate film as an outer package, and then the electrolyte solution was injected inside the outer package. Thereafter, vacuum impregnation (pressure: 10 kPa (abs)) was performed in a chamber, and the outer package was sealed to obtain a battery.

<Battery Evaluation>

The fabricated battery was subjected to a cycle test as follows. 100 cycles of CC-CV charge (upper limit voltage 4.2 V, current 1 C and CV time 1.5 hours) and CC discharge (lower limit voltage 3.0 V and current 1 C) were carried out at 25° C. Table 1 shows the capacity retention rate after 100 cycles, that is, the ratio of the discharge capacity at the $100^{th}$ cycle to the discharge capacity at the first cycle.

Comparative Example 1

Si metal was used as a negative electrode active material instead of the silicon oxide. Except for this, a battery was produced in the same manner as in Example 1, and the battery evaluation was carried out in the same manner.

Example 2

Perfluorosuccinic anhydride (FSA) was used as the additive instead of perfluoroglutaric anhydride (FGA). The concentration of FSA in the electrolyte solution was 0.1 mol/L. Except for this, a battery was produced in the same manner as in Example 1, and the battery evaluation was carried out in the same manner.

Example 3

Perfluoropropionic anhydride (FPA) was used as the additive instead of perfluoroglutaric anhydride (FGA). The concentration of FPA in the electrolyte solution was 0.1 mol/L. Except for this, a battery was produced in the same manner as in Example 1, and the battery evaluation was carried out in the same manner.

Comparative Example 2

Glutaric anhydride (GA) was used as the additive instead of perfluoroglutaric anhydride (FGA). The concentration of GA in the electrolyte solution was 0.1 mol/L. Except for this, a battery was produced in the same manner as in Example 1, and battery evaluation was carried out in the same manner.

Comparative Example 3

Propionic anhydride (PA) was used as the additive instead of perfluoroglutaric anhydride (FGA). The concentration of PA in the electrolyte solution was 0.1 mol/L. Except for this, a battery was produced in the same manner as in Example 1, and the battery evaluation was carried out in the same manner.

Comparative Example 4

Vinylene carbonate (VC) was used as the additive instead of perfluoroglutaric anhydride (FGA). The concentration of VC in the electrolyte solution was 0.1 mol/L. Except for this, a battery was produced in the same manner as in Example 1, and the battery evaluation was carried out in the same manner.

Comparative Example 5

Fluoroethylene carbonate (FEC) was used as the additive instead of perfluoroglutaric anhydride (FGA). The concentration of FEC in the electrolyte solution was 0.1 mol/L. Except for this, a battery was produced in the same manner as in Example 1, and the battery evaluation was carried out in the same manner.

Comparative Example 6

The electrolyte solution not comprising the additive was used. Except for this, a battery was produced in the same manner as in Example 1, and the battery evaluation was carried out in the same manner.

Example 4

The mixing mass ratio of the silicon oxide and the natural graphite in the negative electrode was changed to 90/10. Except for this, a battery was produced in the same manner as in Example 1, and evaluation was carried out in the same manner.

Comparative Example 7

The mixing mass ratio of the silicon oxide and the natural graphite in the negative electrode was changed to 90/10. In addition, the additive was not added to the electrolyte solution. Except for these, a battery was produced in the same manner as in Example 1, and the battery evaluation was carried out in the same manner.

Example 5

The mixing mass ratio of the silicon oxide and the natural graphite in the negative electrode was changed to 80/20. Except for this, a battery was produced in the same manner as in Example 1, and the battery evaluation was carried out in the same manner.

Comparative Example 8

The mixing mass ratio of the silicon oxide and the natural graphite in the negative electrode was changed to 80/20. In addition, the additive was not added to the electrolyte solution. Except for these, a battery was produced in the same manner as in Example 1, and the battery evaluation was carried out in the same manner.

Example 6

The mixing mass ratio of the silicon oxide and the natural graphite in the negative electrode was changed to 70/30. Except for this, a battery was produced in the same manner as in Example 1, and the battery evaluation was carried out in the same manner.

Comparative Example 9

The mixing mass ratio of the silicon oxide and the natural graphite in the negative electrode was changed to 70/30. In addition, the additive was not added to the electrolyte solution. Except for these, a battery was produced in the same manner as in Example 1, and the battery evaluation was carried out in the same manner.

Example 7

The mixing mass ratio of the silicon oxide and the natural graphite in the negative electrode was changed to 50/50. Except for this, a battery was produced in the same manner as in Example 1, and the battery evaluation was carried out in the same manner.

Comparative Example 10

The mixing mass ratio of the silicon oxide and the natural graphite in the negative electrode was changed to 50/50. In addition, the additive was not added to the electrolyte solution. Except for these, a battery was produced in the same manner as in Example 1, and the battery evaluation was carried out in the same manner.

Example 8

The mixing mass ratio of the silicon oxide and the natural graphite in the negative electrode was changed to 30/70. Except for this, a battery was produced in the same manner as in Example 1, and the battery evaluation was carried out in the same manner.

Comparative Example 11

The mixing mass ratio of the silicon oxide and the natural graphite in the negative electrode was changed to 30/70. In addition, the additive was not added to the electrolyte solution. Except for these, a battery was produced in the same manner as in Example 1, and the battery evaluation was carried out in the same manner.

Example 9

The mixing mass ratio of the silicon oxide and the natural graphite in the negative electrode was changed to 10/90. Except for this, a battery was produced in the same manner as in Example 1, and the battery evaluation was carried out in the same manner.

Comparative Example 12

The mixing mass ratio of the silicon oxide and the natural graphite in the negative electrode was changed to 10/90. In addition, the additive was not added to the electrolyte solution. Except for these, a battery was produced in the same manner as in Example 1, and the battery evaluation was carried out in the same manner.

Example 10

A polyacrylic acid copolymer comprising a monomer unit derived from lithium acrylate was used as a negative electrode binder. 90 mass % of the active materials (mixing mass ratio: silicon oxide/natural graphite=100/0), 1 mass % of acetylene black as a conductive assisting agent, and 9 mass % of the polyacrylic acid copolymer comprising a monomer unit derived from lithium acrylate as a binder were mixed, and then pure water was added to this to prepare a negative electrode slurry. Except for this, a battery was produced in the same manner as in Example 1, and the battery evaluation was carried out in the same manner.

Example 11

A polyimide (PI) was used as a negative electrode binder. 80 mass % of the active materials (mixing mass ratio: silicon oxide/natural graphite=100/0), 1 mass % of acetylene black as a conductive assisting agent, and 19 mass % of the polyimide as a binder were mixed, and then pure water was added to this to prepare a negative electrode slurry. Except for this, a battery was produced in the same manner as in Example 1, and the battery evaluation was carried out in the same manner.

Example 12

Styrene butadiene rubber (SBR) and carboxymethyl cellulose (CMC) were used as negative electrode binders. 90 mass % of the active materials (mixing mass ratio: silicon oxide/natural graphite=100/0), 1 mass % of acetylene black as a conductive assisting agent, and 6 mass % of SBR and 3 mass % of CMC as binders were mixed, and then pure water was added to this to prepare a negative electrode slurry. Except for this, a battery was produced in the same manner as in Example 1, and the battery evaluation was carried out in the same manner.

Comparative Example 13

Styrene butadiene rubber (SBR) and carboxymethyl cellulose (CMC) were used as negative electrode binders. 90 mass % of the active materials (mixing mass ratio: silicon oxide/natural graphite=100/0), 1 mass % of acetylene black as a conductive assisting agent, and 6 mass % of SBR and 3 mass % of CMC as binders were mixed, and then pure water was added to this to prepare a negative electrode slurry. In addition, the additive was not added to the electrolyte solution. Except for these, a battery was produced in the same manner as in Example 1, and the battery evaluation was carried out in the same manner.

Example 13

Polyvinylidene fluoride (PVdF) was used as a negative electrode binder. 90 mass % of the active materials (mixing mass ratio: silicon oxide/natural graphite=100/0), 1 mass % of acetylene black as a conductive assisting agent, and 9 mass % of PVdF as a binder were mixed, and then pure water was added to this to prepare a negative electrode slurry. Except for this, a battery was produced in the same manner as in Example 1, and the battery evaluation was carried out in the same manner.

Comparative Example 14

Polyvinylidene fluoride (PVdF) was used as a negative electrode binder. 90 mass % of the active materials (mixing mass ratio: silicon oxide/natural graphite=100/0), 1 mass % of acetylene black as a conductive assisting agent, and 9 mass % of PVdF as a binder were mixed, and then pure water was added to this to prepare a negative electrode slurry. In addition, the additive was not added to the electrolyte solution. Except for these, a battery was produced in the same manner as in Example 1, and the battery evaluation was carried out in the same manner.

Reference Example 1

The mixing mass ratio of the silicon oxide and the natural graphite in the negative electrode was changed to 0/100. Except for this, a battery was produced in the same manner as in Example 1, and the battery evaluation was carried out in the same manner.

Reference Example 2

The mixing mass ratio of the silicon oxide and the natural graphite in the negative electrode was changed to 0/100. In addition, the additive was not added to the electrolyte solution. Except for these, a battery was produced in the same manner as in Example 1, and the battery evaluation was carried out in the same manner.

TABLE 1

|  | Negative electrode active material (1) | Active material (1)/ active material (2) (mass ratio) | Binder | Electrolyte additive | Capacity retention rate (%) |
| --- | --- | --- | --- | --- | --- |
| Example 1 | SiO | 100/0 | Binder (1) | FGA | 92.1 |
| Comparative example 1 | Si | 100/0 | Binder (1) | FGA | 3.5 |
| Example 2 | SiO | 100/0 | Binder (1) | FSA | 91.7 |
| Example 3 | SiO | 100/0 | Binder (1) | FPA | 90.6 |
| Comparative example 2 | SiO | 100/0 | Binder (1) | GA | 88.5 |
| Comparative example 3 | SiO | 100/0 | Binder (1) | PA | 88.4 |
| Comparative example 4 | SiO | 100/0 | Binder (1) | VC | 88.3 |
| Comparative example 5 | SiO | 100/0 | Binder (1) | FEC | 88.8 |
| Comparative example 6 | SiO | 100/0 | Binder (1) | None | 82.8 |
| Example 4 | SiO | 90/10 | Binder (1) | FGA | 93.1 |
| Comparative example 7 | SiO | 90/10 | Binder (1) | None | 85.0 |
| Example 5 | SiO | 80/20 | Binder (1) | FGA | 93.4 |
| Comparative example 8 | SiO | 80/20 | Binder (1) | None | 85.5 |
| Example 6 | SiO | 70/30 | Binder (1) | FGA | 93.5 |
| Comparative example 9 | SiO | 70/30 | Binder (1) | None | 87.5 |
| Example 7 | SiO | 50/50 | Binder (1) | FGA | 93.8 |
| Comparative example 10 | SiO | 50/50 | Binder (1) | None | 89.4 |
| Example 8 | SiO | 30/70 | Binder (1) | FGA | 94.2 |
| Comparative example 11 | SiO | 30/70 | Binder (1) | None | 89.9 |
| Example 9 | SiO | 10/90 | Binder (1) | FGA | 95.3 |
| Comparative example 12 | SiO | 10/90 | Binder (1) | None | 92.2 |
| Example 10 | SiO | 100/0 | Binder (2) | FGA | 90.7 |
| Example 11 | SiO | 100/0 | PI | FGA | 90.1 |
| Example 12 | SiO | 100/0 | SBR + CMC | FGA | 24.7 |
| Comparative example 13 | SiO | 100/0 | SBR + CMC | None | 17.6 |
| Example 13 | SiO | 100/0 | PVdF | FGA | 18.7 |
| Comparative example 14 | SiO | 100/0 | PVdF | None | 10.2 |

TABLE 1-continued

| | Negative electrode active material (1) | Active material (1)/ active material (2) (mass ratio) | Binder | Electrolyte additive | Capacity retention rate (%) |
|---|---|---|---|---|---|
| Reference example 1 | SiO | 0/100 | Binder (1) | FGA | 97.0 |
| Reference example 2 | SiO | 0/100 | Binder (1) | None | 96.7 |

Each abbreviation of Table 1 has the following meaning.
Active material (1): silicon oxide or silicon metal
Active material (2): natural graphite
Binder (1): polyacrylic acid copolymer comprising a monomer unit derived from sodium acrylate
Binder (2): polyacrylic acid copolymer comprising a monomer unit derived from lithium acrylate The results of examples were summarized in Table 1. As shown in Reference examples 1 and 2, the capacity retention rate improvement effect provided by the addition of the fluorinated acid anhydride was hardly seen when only graphite was used in the negative electrode active material. By contrast, the capacity retention rate improvement effect provided by the addition of the fluorinated acid anhydride was confirmed when the silicon oxide was used at least in part of the negative electrode active material. In general, in batteries comprising both graphite and silicon oxide as negative electrode active materials, the lower the silicon oxide content is, the higher the capacity retention rate is. Examples also showed this trend in the same manner. On the other hand, the improvement effect of the fluorinated acid anhydride additive has been found to be large in batteries with high silicon oxide content. In addition, it has been found that the capacity retention rate of the battery can be further improved by using a polyacrylic acid comprising a carboxylic acid sodium salt as a negative electrode binder.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The lithium ion secondary battery according to the present embodiment can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for electrically driven vehicles including an electric vehicle, a hybrid vehicle, an electric motorbike and an electric-assisted bike, and moving/transporting media such as trains, satellites and submarines; backup power supplies for UPSs; and electricity storage facilities for storing electric power generated by photovoltaic power generation, wind power generation and the like.

EXPLANATION OF REFERENCE 10 film package
20 battery element
25 separator
30 positive electrode
40 negative electrode

The invention claimed is:

1. A lithium ion secondary battery comprising:
a negative electrode comprising a binder, a negative electrode active material, and a conductive agent, the negative electrode active material comprising a silicon oxide; and
an electrolyte solution comprising a fluorinated acid anhydride and a non-aqueous solvent which consists of one or more aprotic organic solvents selected from the group consisting of cyclic carbonates, open-chain carbonates, aliphatic carboxylic acid esters, and fluorinated aprotic organic solvents obtainable by substituting at least part of hydrogen atoms of these compounds with fluorine atom(s),
wherein the binder consists essentially of a polymer comprising a monomer unit derived from an alkali metal salt of (meth)acrylic acid,
the alkali metal is selected from the group consisting of Na, Li and K,
an amount of the polymer comprising the monomer unit derived from the alkali metal salt of (meth)acrylic acid in the negative electrode is 9-19 mass % of a total amount of the binder, the negative electrode active material, and the conductive agent, and
an amount of the silicon oxide is 70 mass % or more of a total amount of the negative electrode active material.

2. The lithium ion secondary battery according to claim 1, wherein the fluorinated acid anhydride is a compound in which all hydrogen atoms are substituted with fluorine atoms.

3. The lithium ion secondary battery according to claim 1, wherein the fluorinated acid anhydride is a compound in which all carbon-carbon bonds are single bonds.

4. The lithium ion secondary battery according to claim 1, wherein the fluorinated acid anhydride has a ring structure.

5. The lithium ion secondary battery according to claim 1, wherein a concentration of the fluorinated acid anhydride in the electrolyte solution is 0.005 to 10 mol/L.

6. A vehicle equipped with the lithium ion secondary battery according to claim 1.

7. A method for manufacturing a lithium ion secondary battery according to claim 1, comprising the steps of:
fabricating an electrode element by stacking the negative electrode and a positive electrode via a separator, and encapsulating the electrode element and the electrolyte solution into an outer package.

8. The lithium ion secondary battery according to claim 1, wherein the silicon oxide is a carbon-coated silicon oxide.

9. The lithium ion secondary battery according to claim 8, wherein the polymer comprises a monomer unit derived from sodium (meth)acrylate.

10. The lithium ion secondary battery according to claim 1, wherein the polymer comprises a monomer unit derived from sodium (meth)acrylate.

11. The lithium ion secondary battery according to claim 1, wherein the fluorinated acid anhydride is perfluoroglutaric anhydride.

* * * * *